United States Patent
Huang

(10) Patent No.: US 10,566,919 B2
(45) Date of Patent: Feb. 18, 2020

(54) ELECTRIC MOTOR CONTROL SYSTEM, DRIVER, INVERTER AND CONTROL METHOD, AND COMPUTER SOFTWARE AND STORAGE MEDIUM

(71) Applicant: Siemens Aktiengesellschaft, Munich (DE)

(72) Inventor: Fu Chang Huang, Nanjing (CN)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 15/745,472

(22) PCT Filed: Sep. 24, 2015

(86) PCT No.: PCT/CN2015/090615
§ 371 (c)(1),
(2) Date: Jan. 17, 2018

(87) PCT Pub. No.: WO2017/049547
PCT Pub. Date: Mar. 30, 2017

(65) Prior Publication Data
US 2018/0212542 A1    Jul. 26, 2018

(51) Int. Cl.
*H02P 21/14* (2016.01)
*G01L 3/04* (2006.01)
*H02K 7/116* (2006.01)

(52) U.S. Cl.
CPC .... *H02P 21/14* (2013.01); *G05B 2219/34013* (2013.01)

(58) Field of Classification Search
CPC . G01L 3/04; H02P 21/14; H02P 29/00; H02P 6/16; H02K 7/116; F16H 49/001
See application file for complete search history.

(56) References Cited

U.S. PATENT DOCUMENTS

| 5,218,860 A | 6/1993 | Storar |
| 7,375,487 B2 | 5/2008 | Miyashita et al. |

(Continued)

FOREIGN PATENT DOCUMENTS

| CN | 1755798 A | 4/2006 |
| CN | 101168352 A | 4/2008 |

(Continued)

OTHER PUBLICATIONS

Japanese Office Action and English translation thereof dated Feb. 4, 2019.

(Continued)

*Primary Examiner* — Eduardo Colon Santana
*Assistant Examiner* — Said Bouziane
(74) *Attorney, Agent, or Firm* — Harness, Dickey & Pierce, P.L.C.

(57) ABSTRACT

An electric motor control system includes an electric motor motion signal detection part, configured to provide an electric motor motion signal of the electric motor every other first interval time based on a received first encoder signal sent by the first encoder; a shaft motion signal detection part configured to provide a shaft motion signal of the shaft every other second interval time based on a received second encoder signal sent by the second encoder; and a main control apparatus configured to receive and calculate, according to the electric motor motion signal and the shaft motion signal, an electric motor motion parameter of the electric motor at a moment every other second interval time.

12 Claims, 4 Drawing Sheets

(56) References Cited

U.S. PATENT DOCUMENTS

| | | | |
|---|---|---|---|
| 2006/0039264 | A1 | 2/2006 | Bryant et al. |
| 2006/0250104 | A1* | 11/2006 | Reichert .............. G02B 26/122 |
| | | | 318/651 |
| 2011/0234147 | A1 | 9/2011 | Iwashita et al. |
| 2012/0116715 | A1* | 5/2012 | Yoshitake ............ G01D 5/2451 |
| | | | 702/150 |
| 2015/0048724 | A1* | 2/2015 | Ueda .......................... B25J 9/10 |
| | | | 310/68 B |
| 2015/0316428 | A1 | 11/2015 | Urata |

FOREIGN PATENT DOCUMENTS

| | | |
|---|---|---|
| CN | 101582676 A | 11/2009 |
| CN | 202840903 U | 3/2013 |
| DE | 3734938 A1 | 5/1989 |
| JP | S6165110 A | 4/1986 |
| JP | H08278821 A | 10/1996 |
| JP | 2002278628 A | 9/2002 |
| JP | 2006094668 A | 4/2006 |
| WO | WO 2014098008 A1 | 6/2014 |

OTHER PUBLICATIONS

Extended European Search Report dated May 7, 2019.
Indian Office Action and English translation thereof dated Sep. 18, 2019.
Japanese Office Action and English translation thereof dated Sep. 10, 2019.

\* cited by examiner

US 10,566,919 B2

ELECTRIC MOTOR CONTROL SYSTEM, DRIVER, INVERTER AND CONTROL METHOD, AND COMPUTER SOFTWARE AND STORAGE MEDIUM

PRIORITY STATEMENT

This application is the national phase under 35 U.S.C. § 371 of PCT International Application No. PCT/CN2015/090615 which has an International filing date of Sep. 24, 2015, the entire contents of which are hereby incorporated herein by reference.

FIELD

An embodiment of the present invention generally relates to a control system, and more particularly to an electric motor control system. An embodiment of the present invention also generally relates to an electric motor control method, and also generally relates to a driver and inverter for an electric motor having the above-mentioned electric motor control system, and/or computer software capable of executing the above-mentioned control method, as well as a storage medium capable of storing the computer software.

BACKGROUND ART

In the existing electric motor control system for driving a main shaft by an electric motor, two encoders are generally required. One of the encoders is arranged in the electric motor for feedback of the rotational speed of the electric motor, and the other encoder is arranged at a main shaft in transmission connection with the electric motor for feedback of the rotational position of the main shaft. The electric motor control system can control the electric motor according to the above-mentioned rotational speed of the electric motor and the rotational position of the main shaft.

In some working environments, a relatively high control precision of the main shaft is required, and high-resolution encoders are often required for the above-mentioned two encoders.

SUMMARY

At least one embodiment of the present invention provides an electric motor control system, which can reduce the usage cost of an encoder while ensuring accurate feedback of the rotational speed information about the electric motor.

At least one embodiment of the present invention is to provide a driver or inverter for an electric motor, having the above-mentioned electric motor control system.

At least one embodiment of the present invention is to provide a control method.

At least one embodiment of the present invention is to provide computer software capable of executing the above-mentioned control method.

At least one embodiment of the present invention is to provide a storage medium capable of storing the above-mentioned computer software.

At least one embodiment of the present invention provides an electric motor control system capable of controlling the driving of a shaft by an electric motor, the shaft being in transmission connection with the electric motor, wherein the electric motor is provided with a first encoder, with a sampling interval time thereof being a first interval time $\Delta T$; the shaft is provided with a second encoder, with a sampling interval time thereof being a second interval time $\Delta t$, wherein the first interval time $\Delta T$ is greater than the second interval time $\Delta t$; and the electric motor control system comprises an electric motor motion signal detection part, a shaft motion signal detection part, and a main control apparatus. The electric motor motion signal detection part is capable of providing an electric motor motion signal of the electric motor based on a received first encoder signal sent by the first encoder. The shaft motion signal detection part is capable of providing a shaft motion signal of the shaft based on a received second encoder signal sent by the second encoder. The main control apparatus is capable of receiving the electric motor motion signal and the shaft motion signal and calculating, according to same, an electric motor motion parameter of the electric motor at each time interval of the second interval time $\Delta t$, and controlling the electric motor based on the electric motor motion parameter and an obtained electric motor control signal.

At least one embodiment of the present invention also provides a control method for controlling the driving of a shaft by an electric motor, wherein the electric motor is provided with a first encoder, with a sampling interval time of the first encoder being a first interval time $\Delta T$; and the shaft is in transmission connection with the electric motor, and a second encoder is arranged on the shaft, with a sampling interval time of the second encoder being a second interval time $\Delta t$, wherein the first interval time $\Delta T$ is greater than the second interval time $\Delta t$. The control method comprises: acquiring a first encoder signal sent by the first encoder to obtain an electric motor motion signal of the electric motor at each time interval of the first interval time $\Delta T$; acquiring a second encoder signal sent by the second encoder to obtain a shaft motion signal of the shaft at each time interval of the second interval time $\Delta t$; and according to the electric motor motion signal and the shaft motion signal, calculating an electric motor motion parameter of the electric motor at a time point of each time interval of the second interval time $\Delta t$, and controlling the electric motor based on the electric motor motion parameter and an obtained electric motor control signal.

At least one embodiment of the present invention also provides computer software capable of executing at least one embodiment of the above-mentioned control method.

At least one embodiment of the present invention also provides a storage medium capable of storing the above-mentioned computer software.

In order to more clearly understand the technical features, objectives and effects of the present invention, the specific embodiments of the present invention are described with reference to the accompanying drawings, and in the drawings, the same number represents components of the same structure or of similar structures but the same function.

BRIEF DESCRIPTION OF THE DRAWINGS

The following accompanying drawings merely illustratively describe and explain the present invention and do not limit the scope of the present invention.

DESCRIPTION OF REFERENCE SIGNS

Figure 1:
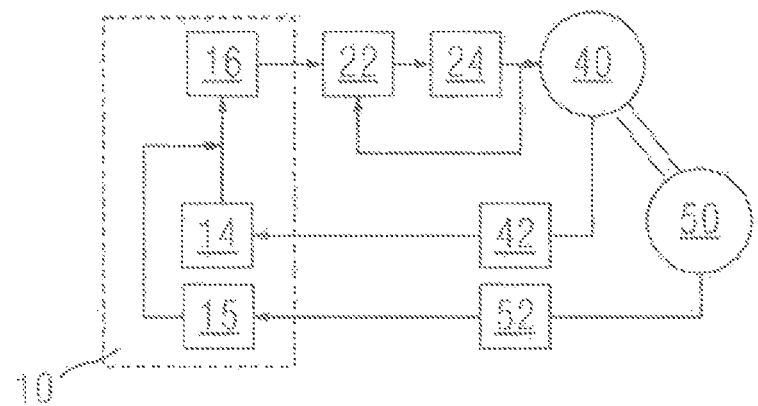
FIG. 1 is a schematic structural diagram for illustrating an illustrative embodiment of an electric motor control system.

10 Electric motor control system
14 Electric motor motion signal detection part
15 Shaft motion signal detection part
16 Main control apparatus
162 Electric motor speed calculation part
164 Position controller
166 Speed controller
22 Current controller
24 Signal amplifier
40 Electric motor
42 First encoder
50 Shaft, main shaft
52 Second encoder.

DETAILED DESCRIPTION OF THE EXAMPLE EMBODIMENTS

At least one embodiment of the present invention provides an electric motor control system capable of controlling the driving of a shaft by an electric motor, the shaft being in transmission connection with the electric motor, wherein the electric motor is provided with a first encoder, with a sampling interval time thereof being a first interval time $\Delta T$; the shaft is provided with a second encoder, with a sampling interval time thereof being a second interval time $\Delta t$, wherein the first interval time $\Delta T$ is greater than the second interval time $\Delta t$; and the electric motor control system comprises an electric motor motion signal detection part, a shaft motion signal detection part, and a main control apparatus. The electric motor motion signal detection part is capable of providing an electric motor motion signal of the electric motor based on a received first encoder signal sent by the first encoder. The shaft motion signal detection part is capable of providing a shaft motion signal of the shaft based on a received second encoder signal sent by the second encoder. The main control apparatus is capable of receiving the electric motor motion signal and the shaft motion signal and calculating, according to same, an electric motor motion parameter of the electric motor at each time interval of the second interval time $\Delta t$, and controlling the electric motor based on the electric motor motion parameter and an obtained electric motor control signal.

The shaft of at least one embodiment of the present invention is particularly the main shaft. With this embodiment of the present invention, the precision of the first encoder of the electric motor can only provide a precise electric motor motion parameter at each time interval of the first interval time $\Delta T$; however, by way of the electric motor control system according to at least one embodiment of the present invention, the motion parameter of the electric motor can be provided according to the resolution of the second encoder with a better resolution.

In an illustrative embodiment of the electric motor control system, according to the received electric motor motion signal obtained at an angular position change time T detected by the first encoder and the received shaft motion signal, the main control apparatus calculates the electric motor motion parameter at each time interval of the second interval time $\Delta t$ from the angular position change time T, until the first encoder detects the next angular position change time T'. The angular position change times T and T' are the time when the first encoder itself sends out the first encoder signal, and are the time when the first encoder can directly feed back the electric motor motion signal through the first encoder signal, i.e. can directly feed back the rotational speed and position of the electric motor; however, the first encoder does not send out the first encoder signal within a period of time between times T and T', and cannot feed back information such as the rotational speed and position of the electric motor at a certain time between times T and T', and the encoder signal with a higher resolution than the first encoder can give information such as the rotational speed and position at a certain time between times T and T', that is, information such as the rotational speed and position of the electric motor at a certain time at the time T. This is the reason why the higher the sampling frequency, the more precise the encoder.

The electric motor control system according to at least one embodiment of the present invention may utilize the shaft motion signal directly fed back from the second encoder signal of the second encoder to calculate the electric motor motion parameter at each time interval of the second interval time $\Delta t$ within the period of time between times T and T', so as to control the electric motor more precisely where the first encoder has a low resolution, and thus is more cost effective than a system using two high-precision encoders.

In an illustrative embodiment of the electric motor control system, the electric motor motion signal at least includes a position signal of the electric motor and a rotational speed signal of the electric motor; the shaft motion signal at least includes a position signal of the shaft and a rotational speed signal of the shaft; and the electric motor motion parameter includes an angular displacement, a rotational speed, and an acceleration of the electric motor at each time interval of the second interval time $\Delta t$.

In an illustrative embodiment of the electric motor control system, the main control apparatus includes an electric motor speed calculation part, a position controller and a speed controller. The electric motor speed calculation part receives the electric motor motion signal and the shaft motion signal, calculates the electric motor motion parameter of the electric motor at each time interval of the second interval time $\Delta t$ from the angular position change time T, and outputs the electric motor motion parameter until the first encoder detects the next angular position change time T'. The position controller is capable of receiving the shaft motion signal and thereby outputting a rotational speed control signal. The speed controller is capable of receiving the electric motor motion parameter and the rotational speed control signal and thereby outputting a control signal able to control the electric motor. With the above-mentioned structure, the electric motor control system can control the rotational speed of the electric motor more precisely at each time interval of $\Delta t$ between the angular position change times T and T'.

At least one embodiment of the present invention also provides a driver for an electric motor. The driver comprises an electric motor control system as described above.

At least one embodiment of the present invention also provides an inverter for an electric motor, comprising an electric motor control system as described above.

At least one embodiment of the present invention also provides a control method for controlling the driving of a shaft by an electric motor, wherein the electric motor is provided with a first encoder, with a sampling interval time of the first encoder being a first interval time $\Delta T$; and the shaft is in transmission connection with the electric motor, and a second encoder is arranged on the shaft, with a sampling interval time of the second encoder being a second interval time $\Delta t$, wherein the first interval time $\Delta T$ is greater than the second interval time $\Delta t$. The control method comprises: acquiring a first encoder signal sent by the first encoder to obtain an electric motor motion signal of the electric motor at each time interval of the first interval time $\Delta T$; acquiring a second encoder signal sent by the second encoder to obtain a shaft motion signal of the shaft at each time interval of the second interval time $\Delta t$; and according to the electric motor motion signal and the shaft motion signal, calculating an electric motor motion parameter of the electric motor at a time point of each time interval of the second interval time $\Delta t$, and controlling the electric motor based on the electric motor motion parameter and an obtained electric motor control signal.

In an illustrative embodiment of the control method, the calculating step further comprises: step S10, calculating, according to the electric motor motion signal obtained at an angular position change time T detected by the first encoder, and the shaft motion signal, the electric motor motion parameter at the angular position change time T; and step S20, calculating, according to the electric motor motion parameter at the angular position change time T, the electric motor motion parameter at each time interval of the second interval time $\Delta t$, until the first encoder detects the next angular position change time T'.

In an illustrative embodiment of the control method, the electric motor motion signal at least includes a position signal of the electric motor and a rotational speed signal of the electric motor; the shaft motion signal at least includes a position signal of the shaft and a rotational speed signal of the shaft; and the electric motor motion parameter includes an angular displacement, a rotational speed, and an acceleration of the electric motor at each time interval of the second interval time $\Delta t$.

In an illustrative embodiment of the control method, step S10 further comprises: step S11, obtaining, according to the electric motor motion signal acquired at an angular position change time T, an angular displacement $\theta_m$ of the electric motor and a rotational speed $\omega_m$ of the electric motor at the angular position change time T, obtaining, according to the shaft motion signal acquired at the angular position change time T, an angular displacement $\theta_L$ of the shaft at the angular position change time T, and controlling the rotation of the electric motor according to the rotational speed $\omega_m$ of the electric motor and the electric motor control signal at the angular position change time T; and step S12, calculating an angular acceleration $\alpha_m$ of the electric motor at the angular position change time T according to the angular displacement $\theta_m$ of the electric motor and the angular displacement $\theta_L$ of the shaft at the angular position change time T; and step S20 further comprises: step S21, obtaining an angular displacement $\theta_{L+1}$ of the shaft at a time T+$\alpha t$ according to the shaft motion signal acquired at the time T+$\Delta t$; step S22, calculating a rotational speed $\omega_{m+1}$ of the electric motor, an angular displacement $\theta_{m+1}$ of the electric motor, and an angular acceleration $\alpha_{ma+1}$ of the electric motor at the time T+$\Delta t$ according to the rotational speed $\omega_m$ of the electric motor and the angular acceleration $\alpha_m$ of the electric motor at the angular position change time T, and the angular displacement $\theta_{L+1}$ of the shaft at the time T+$\Delta t$, and controlling the rotation of the electric motor according to the rotational speed $\omega_{m+1}$ of the electric motor and the electric motor control signal at the time T+$\Delta t$; and step S23, making T=T+$\Delta t$, and if at this time T+$\Delta t$ is less than the next angular position change time T' of the first encoder, then $\theta_m=\theta_{m+1}$, $\omega_m=\omega_{m+1}$, $\alpha_m=\alpha_{m+1}$, and returning to step S21; and if at this time T+$\Delta t$ is equal to the next angular position change time T' of the first encoder, then T=T', and returning to step S10.

At least one embodiment of the present invention also provides computer software capable of executing at least one embodiment of the above-mentioned control method.

At least one embodiment of the present invention also provides a storage medium capable of storing the above-mentioned computer software.

The above-mentioned characteristics, technical features, advantages and implementations of the electric motor control system, the driver, the inverter and control method, the computer software and the storage medium will be further described below in a manner which is clear and easy to be understood and in conjunction with accompanying drawings and example embodiments.

In order to more clearly understand the technical features, objectives and effects of the present invention, the specific embodiments of the present invention are described with reference to the accompanying drawings, and in the drawings, the same number represents components of the same structure or of similar structures but the same function.

The word "illustrative" represents "acting as an instance, example or description" herein, and any illustration and embodiment described as "illustrative" herein should not be construed as a more preferred or more advantageous technical solution.

In order to make the figures concise, the parts relevant to the present invention are merely shown illustratively in the figures, and they do not represent the actual structure as a product thereof. In addition, in order to make the figures concise and easy to be understood, in some figures, there are components of the same structure or function, and only one therein is drawn illustratively or only one therein is marked.

The words "first", "second", etc. herein are merely used for distinguishing parts from each other rather than representing the degree of importance and order, etc. thereof.

FIG. 1 is a schematic structural diagram for illustrating an illustrative embodiment of an electric motor control system. As shown in FIG. 1, the electric motor control system 10 is capable of controlling the driving of a shaft 50 by an electric motor 40, in particular, controlling the rotation of a main shaft. The shaft 50 is in transmission connection with the electric motor 40, in particular the electric motor 40 is in torque transmission connection with the shaft 50. The electric motor 40 is provided with a first encoder 42, and the shaft 50 is provided with a second encoder 52. The measurement precision of the encoders is determined by the resolution thereof, and the resolution is also referred to as resolution indexing, usually, the higher the resolution, the greater the number of aliquot sampling points during one revolution of the encoder, namely the greater the number of lines, while the interval between adjacent sampling points, i.e. adjacent lines may also be referred to as a sampling interval, and an elapsed time over a single sampling interval of the encoder, i.e., a time elapsed between adjacent lines, may be referred to as a sampling interval time.

In this embodiment, the sampling interval time of the single sampling interval of the first encoder 42 is the first interval time $\Delta T$, that is, the first encoder 42 sends out a first encoder signal at each time interval of the first interval time $\Delta T$. The first encoder signal may be a pulse, the magnitude of displacement of the first encoder at each time interval of $\Delta T$ may be obtained by way of the pulse, and a motion parameter of the electric motor may be obtained therefrom. The motion parameter may include an angular position (an angular displacement), a rotational speed, and an acceleration of the electric motor. The sampling interval time of the single sampling interval of the second encoder 52 is the second interval time Δt. Similarly, the second encoder 52 sends out a second encoder signal at each time interval of the first interval time ΔT, thereby acquiring the motion parameter of the shaft, in particular the main shaft 50.

It should be pointed out here that, according to an embodiment of the present invention, the first interval time ΔT is greater than the second interval time Δt, i.e., the resolution of the first encoder according to an embodiment of the present invention is less than the resolution of the second encoder.

In addition, in the field of electric motor control, a driver or an inverter is typically arranged to control the driving of the electric motor. Therefore, a signal amplifier 24 for amplifying a signal input to the electric motor and a current controller 22 for controlling a current signal input to the electric motor are typically arranged in the driver or the inverter. The signal amplifier 24 and the current controller 22 are used to realize the current loop control of the electric motor.

In addition, in order to realize the control of the driving of the main shaft by the electric motor according to an embodiment of the present invention, the driver or inverter for the electric motor further comprises an electric motor control system 10 according to an embodiment of the present invention. The electric motor control system 10 comprises an electric motor motion signal detection part 14, a shaft motion signal detection part 15 and a main control apparatus 16. The electric motor motion signal detection part 14 is communicable with the first encoder, and is capable of calculating and outputting an electric motor motion signal of the electric motor 40 at each time interval of the first interval time ΔT based on the received first encoder signal sent by the first encoder 42.

The electric motor motion signal may include a position signal (particularly, an angular position or angular displacement signal) of the electric motor and a rotational speed signal of the electric motor. The shaft motion signal detection part 15 is communicable with the second encoder 52 and receives the second encoder signal sent by the second encoder 52, and calculates and outputs a shaft motion signal of the shaft 50 at each time interval of the second interval time Δt. The shaft motion signal may include a position signal (particularly, an angular position or angular displacement signal) of the shaft, a rotational speed signal of the shaft, etc.

The main control apparatus 16 receives the electric motor motion signal provided by the electric motor motion signal detection part 14 and the shaft motion signal provided by the shaft motion signal detection part 15, and calculates, on this basis, a motion parameter of the electric motor at a time point of each time interval of the second interval time Δt, and controls, based on this, the electric motor on the basis that the electric motor control signal is obtained. That is to say, the precision of the first encoder 42 of the electric motor 40 can only provide a precise electric motor motion parameter of the first interval time ΔT at each time interval, however by way of the electric motor control system according to an embodiment of the present invention, the motion parameter of the electric motor can be provided according to the resolution of the second encoder 52 with a better resolution.

The above-mentioned electric motor control system can still control the electric motor with relatively high precision while reducing the resolution of one encoder, thereby reducing the cost of the encoder. In an embodiment of the present invention, the electric motor motion signal detection part 14, the shaft motion signal detection part 15 and the main control apparatus 16 may be implemented in software or hardware respectively, wherein the electric motor motion signal detection part 14, the shaft motion signal detection part 15 and a main control apparatus 16 may be separate hardware or software, or may be integral software or hardware, for example, may be a processing apparatus.

In one embodiment, the main control apparatus 16 is capable of receiving an electric motor motion signal obtained at an angular position change time T detected by the first encoder 42 and receiving a main shaft motion signal, and calculating, based on the received electric motor motion signal and shaft motion signal, an electric motor motion parameter at each time interval of the second interval time Δt from the angular position change time T, until the first encoder 42 detects the next angular position change time T', wherein the motion parameter includes the position and rotational speed of the electric motor at each time interval of the second interval time Δt. The angular position change times T and T' are the time when the first encoder itself sends out the first encoder signal, and are the time when the first encoder can directly feed back the electric motor motion signal through the first encoder signal, i.e. can directly feed back the rotational speed and position of the electric motor; however, the first encoder does not send out the first encoder signal within a period of time between times T and T', and cannot feed back the rotational speed and position of the electric motor. In the above-mentioned embodiment, the electric motor motion parameter is calculated at each time interval of the second interval time Δt within the period of time between times T and T' based on the electric motor motion signal detected at the angular position change time T and by way of the shaft motion signal directly fed back from the second encoder signal of the second encoder 52, in order to more precisely control the electric motor.

Figure 2:
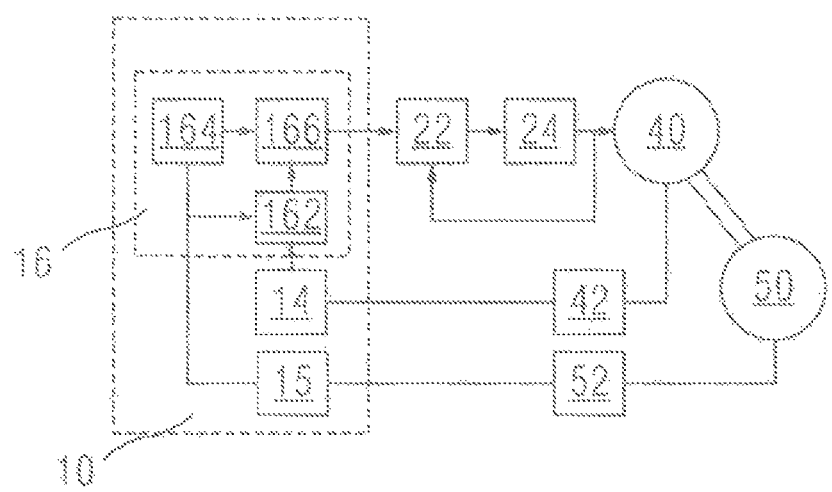
FIG. 2 is a schematic structural diagram for illustrating another illustrative embodiment of the electric motor control system.

In the embodiment shown in FIG. 2, the main control apparatus 16 of the electric motor control system may further include an electric motor speed calculation part 162, a position controller 164 and a speed controller 166. The electric motor speed calculation part 162 may communicate with an electric motor motion signal detection part 14 and a shaft motion signal detection part 15 respectively, and can respectively receive the electric motor motion signal from the electric motor motion signal detection part 14 and receive the shaft motion signal from the shaft motion signal detection part 15 so as to calculate an electric motor motion parameter of the electric motor at each time interval of the second interval time Δt from the angular position change time T and output the electric motor motion parameter.

The electric motor motion parameter may include the position and the rotational speed of the electric motor at each time interval of the second interval time Δt, until the first encoder 42 detects the next angular position change time T'. The position controller 164 can receive the shaft motion signal output from the shaft motion signal detection part 15, and output a rotational speed control signal according to the shaft motion signal.

The speed controller 166 can be respectively connected to the position controller 164 and the electric motor speed calculation part 162, and can receive the electric motor motion parameter and the rotational speed control signal, and thereby output a control signal capable of controlling the electric motor 40. The position controller 164 obtains the current position of the shaft according to the received shaft motion signal, and can output a rotational speed control signal according to the current position of the shaft for controlling the position of the main shaft by way of controlling the rotational speed of the electric motor with the speed controller 166, so as to realize the control of the position loop of the electric motor. The speed controller 166 controls the electric motor according to the electric motor motion parameter, so as to realize the control of the speed loop of the electric motor.

In addition, the electric motor control system 10 as described above may be implemented either in software or in hardware. When it is implemented in hardware, a control unit may be implemented by a DSP, an FPGA or other similar chips with a processing function, which can realize the above-mentioned functional modules. The above-mentioned functions of the control unit can also be realized as program codes, which include instructions that can achieve the above-mentioned functions. The program codes may be recorded in a machine-readable storage medium, such as a readable memory module, and these program codes may be executed by, for example, a CPU or an MCU to achieve the above-mentioned functions. The embodiments of the storage medium for providing the program codes comprise a floppy disk, a hard disk, a magnetic optical disc, an optical disc (such as CD-ROM, CD-R, CD-RW, DVD-ROM, DVD-RAM, DVD-RW and DVD+RW), a magnetic tape, a non-volatile memory card and ROM. Optionally, the program codes may be downloaded from a server computer via a communication network.

In addition, the structure of the debugging system as described above is exemplary. According to actual needs, the various units and modules included in the electric motor control system can be combined or split into different modules, or can also be integrated into one module. This would be obvious to those skilled in the art.

An embodiment of the present invention also relates to a driver or inverter for an electric motor, which, as shown in FIG. 1, includes an electric motor control system 10 as described above. The driver or inverter also typically comprises a current control apparatus 22 and a signal amplifier 24, wherein the electric motor control system outputs an electric motor control instruction to the current control apparatus 22; and the signal amplifier 24 receives the control instruction from the current control apparatus 22 and outputs same to the electric motor 40, and the current control apparatus 22 and the signal amplifier 24 can constitute the current loop control of the electric motor.

An embodiment of the present invention also provides a control method for controlling the driving of a shaft 50 by an electric motor 40. Reference can also be made to FIG. 1. The electric motor 40 is provided with a first encoder 42, with a sampling interval time of a single sampling interval of the first encoder 42 being a first interval time $\Delta T$. The shaft 50 is in transmission connection with the electric motor 40 and a second encoder 52 is provided on the shaft, with a sampling interval time of a single sampling interval of the second encoder 52 being a second interval time $\Delta t$, wherein the first interval time $\Delta T$ is greater than the second interval time $\Delta t$.

In an embodiment, the electric motor control method comprises: acquiring a first encoder signal sent by the first encoder 42 to obtain an electric motor motion signal of the electric motor 40 at each time interval of the first interval time $\Delta T$, the electric motor motion signal including at least a position signal of the electric motor and a rotational speed signal of the electric motor; acquiring a second encoder signal sent by the second encoder 42 to obtain a shaft motion signal of the shaft 50 at each time interval of the second interval time $\Delta t$, the shaft motion signal including at least a position signal of the shaft and a rotational speed signal of the shaft; and according to the electric motor motion signal and the shaft motion signal, calculating an electric motor motion parameter of the electric motor at a time point of each time interval of the second interval time $\Delta t$, and controlling the electric motor based on the electric motor motion parameter and an obtained electric motor control signal.

Figure 3:
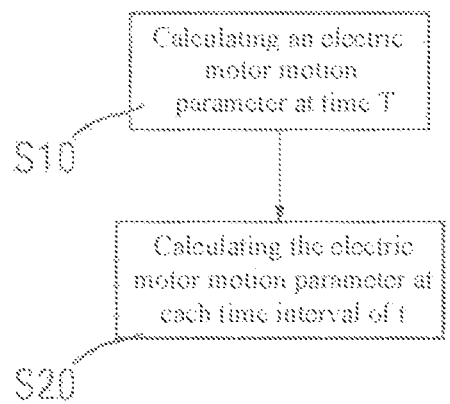
FIG. 3 is a flow chart for illustrating an illustrative embodiment of a calculating step of an electric motor control method.

Referring to FIG. 3, the calculating step in the above-mentioned control method further comprises: step S10, calculating, according to the electric motor motion signal obtained at an angular position change time T detected by the first encoder 42, and the shaft motion signal, the electric motor motion parameter at the angular position change time T; and step S20, calculating, according to the electric motor motion parameter at the angular position change time T that is calculated in step S10, the electric motor motion parameter at each time interval of the second interval time $\Delta t$, until the first encoder 52 detects the next angular position change time T'. The motion parameter includes the position and rotational speed of the electric motor at each time interval of the second interval time $\Delta t$.

Figure 4:
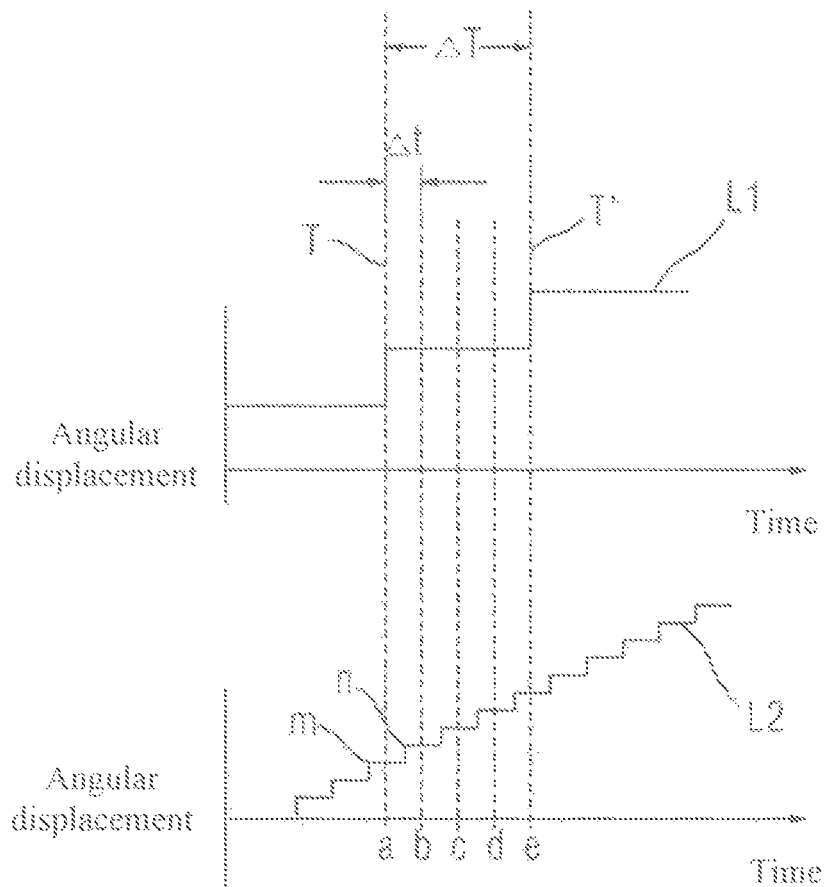
FIG. 4 is used to illustrate the process of signal acquisition by a first encoder and a second encoder.

The specific implementation of the above-mentioned calculating steps is given below. Reference is made to FIG. 4 first. FIG. 4 is used to illustrate the process of signal acquisition by the first encoder and the second encoder. The top diagram in FIG. 4 is a waveform diagram L1 of the first encoder signal of the first encoder 42, wherein the turning positions of the waveform diagram L1 are the angular position change times of the first encoder 42, such as the positions at T and T' shown in FIG. 4, and at these positions, the electric motor motion signal can be obtained, i.e., the motion signal of the electric motor can be obtained at each time interval of the first interval time $\Delta T$. By the same reasoning, the bottom diagram in FIG. 4 is a waveform diagram L2 of the second encoder signal of the second encoder 52, wherein the turning positions of the waveform graph L2 are the angular position change times of the second encoder, such as m and n positions shown in FIG. 4, and at these positions, the motion signal of the shaft can be obtained, i.e., the motion signal of the electric motor can be obtained at each time interval of the second interval time $\Delta t$ (the distance from point a to point b in the diagram is equal to the distance from point m to point n).

It can be seen from FIG. 4 that the first interval time $\Delta T$ is greater than the second interval time $\Delta t$, that is, the first encoder 42 itself can only feed back a motion signal of the electric motor at each relatively long time interval of the first interval time $\Delta T$, but cannot feed back a motion signal of the electric motor at each relatively short time interval of the second interval time $\Delta t$ like the second encoder 52. Hence, the first encoder 42 itself cannot feed back the motion signal of the electric motor at the positions b, c and d in FIG. 4. The control method of the present application is obtaining a motion signal of the underframe at positions b, c and d by way of calculation, so as to more precisely control the electric motor.

Figure 5:
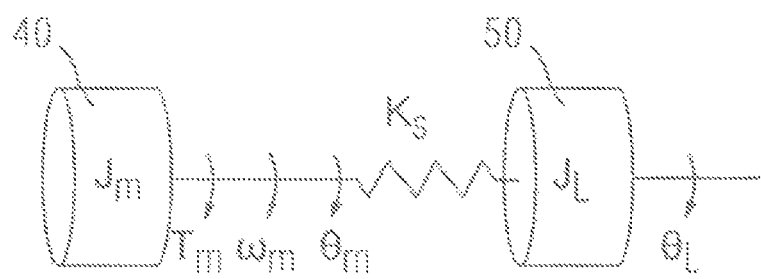
FIG. 5 is used to illustrate a two-mass system between an electric motor and a shaft.

Before describing a specific step according to an embodiment of the present invention of the control method, reference is first made to FIG. 5. The electric motor 40 and the shaft 50 are modelled as a two-mass system, according to which the following formula can be used to calculate the acceleration $\alpha_m$ of the electric motor: $\alpha_m = (T_m - K_s(\theta_m - \theta_1))/J_m$, wherein Jm is a moment of inertia of the electric motor, $T_m$ is a load torque of the electric motor at the angular position change time T, the load torque $T_m$ can be obtained by a conventional sensor, $\theta_m$ is an angular displacement of the electric motor, and $\theta_1$ is an angular displacement of the shaft. It should be noted here that, this model is only an exemplary model, and those skilled in the art can establish different models to calculate the position and rotational speed of the electric motor at each time interval of the second interval time $\Delta t$ by way of the parameters that can be acquired and the actual situation.

In the above-mentioned model, the equivalent stiffness $K_s$ between the electric motor and the shaft can be determined during an installation phase, and in one embodiment can be obtained according to a frequency response between the electric motor and the main shaft: a nature torsional frequency $f_{NTF}$ between the electric motor and the main shaft, and an anti-resonant frequency $f_{ARF}$ between the electric motor and the main shaft. $K_s$, $K_s=4\pi^2 (f_{NTF}^2-f_{ARF}^2) J_m$ is calculated by using $f_{NTF}$ and $f_{ARF}$, wherein Jm is the moment of inertia of the electric motor.

Figure 6:
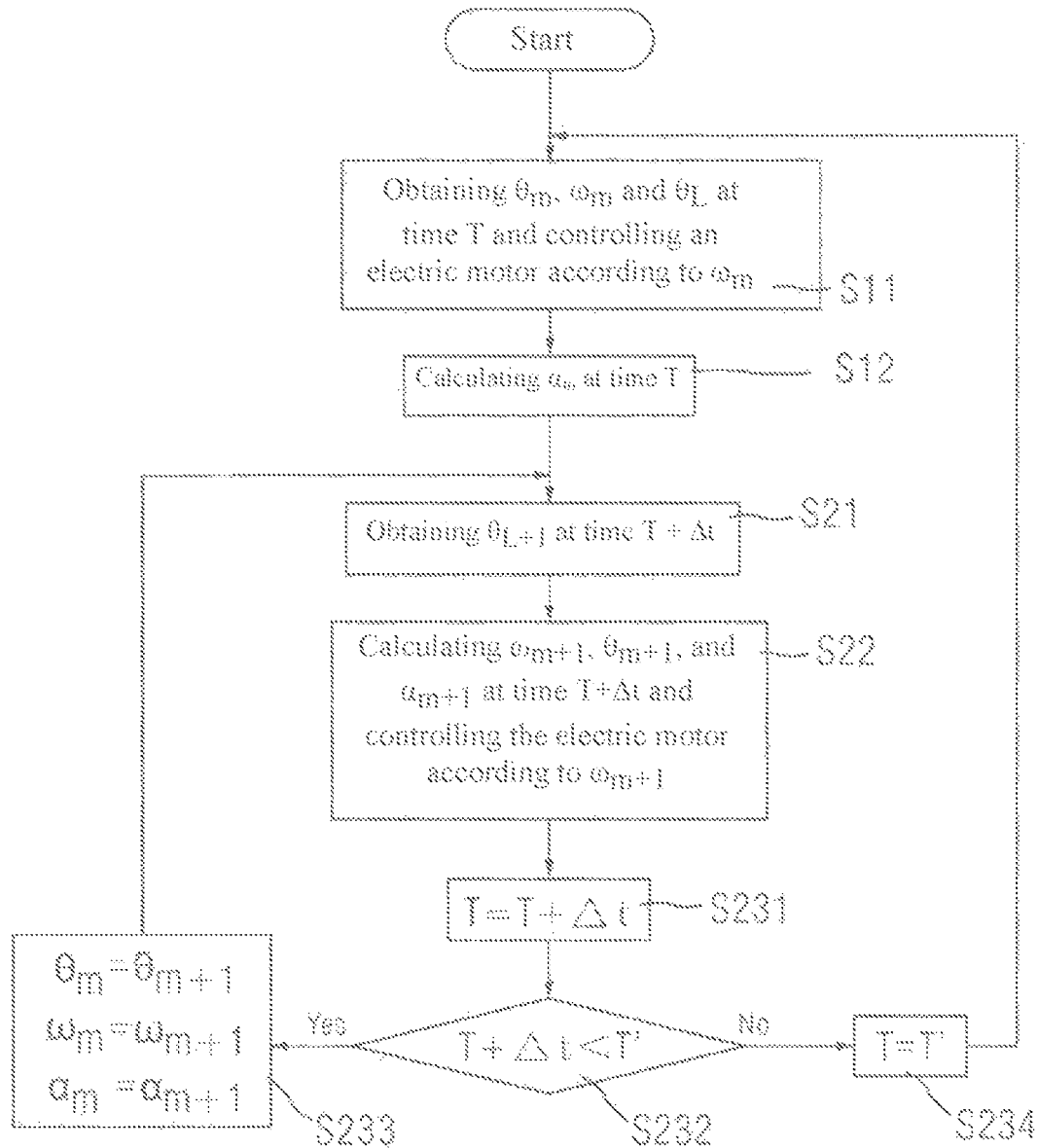
FIG. 6 is a flow chart for illustrating a specific illustrative embodiment of the calculating step shown in FIG. 3.

FIG. 6 is a flow chart for illustrating a specific illustrative embodiment of the calculating step shown in FIG. 3. First, step S10 in FIG. 3 further comprises:

step S11, obtaining, when the first encoder 42 detects an angular position change time T, a precise angular position $\theta_m$ of the electric motor and the rotational speed $\omega_m$ of the electric motor at that time by way of the electric motor motion signal obtained from the first encoder signal (for example, the position of point a in FIG. 3); and at the same time, based on the shaft motion signal obtained at the angular position change time T (actually being the shaft motion signal obtained at point m in FIG. 3 due to the resolution), obtaining an angular displacement $\theta_L$ of the shaft at point m. At this time, the rotation of the electric motor is controlled according to the rotational speed $\omega_m$ of the electric motor at the angular position change time T;

step S12, calculating, according to the angular displacement $\theta_m$ of the electric motor at the angular position change time T and the angular displacement $\theta_L$ of the shaft obtained at the angular position change time T, a real-time angular acceleration $\alpha_m$ of the electric motor at the angular position change time T, the angular acceleration $\alpha_m=(T_m-K_s(\theta_m-\theta_L))/J_m$, wherein Jm is the moment of inertia of the electric motor, $T_m$ is the load torque of the electric motor at the angular position change time T, and the load torque $T_m$ can be acquired from a conventional sensor or by way of real-time feedback of the electric motor, which will not be repeated herein.

Then, step S20 is performed. Step S20 further comprises:

step S21, obtaining, according to the shaft motion signal acquired at the time $T+\Delta t$ (point b in FIG. 3) (that is, the shaft motion signal obtained by the second encoder 52 at point n in FIG. 3), a measured angular displacement $\theta_{L+1}$ of the shaft at point b;

step S22, calculating, according to the rotational speed $\omega_m$ and the angular acceleration $\alpha_m$ of the electric motor at the angular position change time T and the measured angular displacement $\theta_{L+1}$ of the shaft at $T+\Delta t$ (point b), a rotational speed $\omega_{ma+1}=\omega_m+\alpha_m\Delta t$ of the electric motor, an angular displacement $\theta_{m+1}=\theta_m+\alpha_m\Delta t^2/2$ of the electric motor and an angular acceleration $\alpha_{ma+1}=(T_{m+1}-K_s(\theta_{m+1}-\theta_{L+1}))/J_m$ of the electric motor at $T+\Delta t$, wherein $J_m$ is the moment of inertia of the electric motor, and $T_{m+1}$ is the load torque of the electric motor at the angular position change time $T+\Delta t$, which can be acquired from a conventional sensor or by way of real-time feedback of the electric motor. As a result, the electric motor motion parameter at $T+\Delta t$ is obtained with the resolution of the second encoder, and the electric motor motion parameter calculated at this time is more precise than the data directly provided by the first encoder at the time $T+\Delta t$. Therefore, the electric motor is controlled to rotate according to the rotational speed $\omega_{m+1}$, the position and the acceleration of the electric motor at $T+\Delta t$; and step S23, comprising the following several steps: an assigning step S231, making $T=T+\Delta t$, that is, assigning T to $T+\Delta t$, so that an actual value of T used in the subsequent calculation is $T+\Delta t$; and a comparing step S232, comparing $T+\Delta t$ with the next angular position change time T', and if $T+\Delta t$ is less than the next angular position change time T' of the first encoder 42, i.e., at the positions of points c and d in FIG. 2, re-assigning being required, entering step S233, and performing assignment to make $\theta_m=\theta_{m+1}$, $\omega_m=\omega_{m+1}$ and $\alpha_m=\alpha_{m+1}$, and returning to step S14; and if $T+\Delta t$ is equal to the next angular position change time T' of the first encoder 42 at this time, entering step S234, performing assignment to make T=T', and returning to step S11 of step S10 to re-obtain the angular displacement $\theta_m$ of the electric motor, the rotational speed $\omega_m$ of the electric motor, and the angular displacement $\theta_L$ of the shaft, and carrying out a new round of calculations on this basis.

The above-mentioned electric motor control method can reduce the requirement for the resolution of the first encoder so that the first encoder connected to the electric motor can use a relatively low-resolution encoder, and can greatly reduce the cost of the electric motor control system while ensuring accurate feedback of the rotational speed information about the electric motor.

It should be understood that although this description is described according to various embodiments, not each of the embodiments only contains one independent technical solution, and such narrative style of the description is merely for the sake of clarity, and those skilled in the art should take the description as a whole and the technical solutions in the various embodiments may also be combined appropriately to form other implementations which can be understood by those skilled in the art.

A series of detailed descriptions listed above are merely specific descriptions regarding feasible embodiments of the present invention, but not used to limit the scope of protection of the present invention. Any equivalent embodiment or alteration, such as a combination, division or repetition of features, made without departing from the technical spirit of the present invention should all be contained within the scope of protection of the present invention.

The invention claimed is:

1. An electric motor control system capable of controlling driving of a shaft by an electric motor, the shaft being in transmission connection with the electric motor, the electric motor being provided with a first encoder, a sampling interval time of the first encoder being a first interval time and the shaft being provided with a second encoder, a sampling interval time of the second encoder being a second interval time, the first interval time being relatively greater than the second interval time, the electric motor control system comprising:

an electric motor motion signal detection part to provide an electric motor motion signal of the electric motor based on a received first encoder signal sent by the first encoder;

a shaft motion signal detection part to provide a shaft motion signal of the shaft based on a received second encoder signal sent by the second encoder; and a main control apparatus to receive the electric motor motion signal and the shaft motion signal and to calculate, according to the electric motor motion signal and the shaft motion signal, an electric motor motion parameter of the electric motor at each time interval of the second interval time, and to control the electric motor based on the electric motor motion parameter and an obtained electric motor control signal, wherein the main control apparatus is further configured to calculate, according to the electric motor motion signal obtained at an angular position change time detected by the first encoder and the shaft motion signal, the electric motor motion parameter at each time interval of the second interval time from the angular position change time, until the first encoder detects a next angular position change time, and wherein the electric motor motion signal includes a position signal of the electric motor and a rotational speed signal of the electric motor, the shaft motion signal includes a position signal of the shaft and a rotational speed signal of the shaft, and the electric motor motion parameter includes an angular displacement, a rotational speed and an acceleration of the electric motor at each time interval of the second interval time, wherein the main control apparatus is further configured to calculate acceleration αm at the angular position change time, as the electric motor motion parameter, based on:

$$\alpha m=(Tm-Ks(\theta m-\theta 1))/Jm,$$

wherein Jm is a moment of inertia of the electric motor, Tm is a load torque of the electric motor at the angular position change time T, θm is an angular displacement of the electric motor, and θ1 is an angular displacement of the shaft, and Ks is an equivalent stiffness between the electric motor and the shaft.

2. The electric motor control system of claim 1, wherein the main control apparatus comprises:
an electric motor speed calculation part to receive the electric motor motion signal and the shaft motion signal, to calculate the electric motor motion parameter of the electric motor at each time interval of the second interval time from the angular position change time, and to output the electric motor motion parameter, until the first encoder detects a next angular position change time;
a position controller to receive the shaft motion signal and to thereby output a rotational speed control signal; and
a speed controller to receive the electric motor motion parameter and the rotational speed control signal, and to thereby output a control signal able to control the electric motor.

3. A driver for an electric motor, comprising the electric motor control system of claim a 2.

4. An inverter for an electric motor, the inverter comprising the electric motor control system of claim 2.

5. A driver for an electric motor, comprising the electric motor control system of claim 1.

6. An inverter for an electric motor, the inverter comprising the electric motor control system of claim 1.

7. A control method for controlling driving of a shaft by an electric motor, the electric motor being provided with a first encoder, a sampling interval time of the first encoder being a first interval time and the shaft being in transmission connection with the electric motor and including a second encoder provided on the shaft, a sampling interval time of the second encoder being a second interval time, the first time interval being relatively greater than the second interval time, the control method comprising:
acquiring a first encoder signal sent by the first encoder to obtain an electric motor motion signal of the electric motor at each time interval of the first interval time;
acquiring a second encoder signal sent by the second encoder to obtain a shaft motion signal of the shaft at each time interval of the second interval time;
calculating, according to the obtained electric motor motion signal and the obtained shaft motion signal, an electric motor motion parameter of the electric motor at a time point of each time interval of the second interval time; and
controlling the electric motor based on the electric motor motion parameter calculated and an obtained electric motor control signal;
calculating, according to the electric motor motion signal obtained at an angular position change time detected by the first encoder and the shaft motion signal, the electric motor motion parameter at each time interval of the second interval time from the angular position change time, and
calculating, according to the electric motor motion parameter at the angular position change time, the electric motor motion parameter at each time interval of the second interval time, until the first encoder detects a next angular position change time,
wherein the obtained electric motor motion signal includes a position signal of the electric motor and a rotational speed signal of the electric motor, the shaft motion signal includes a position signal of the shaft and a rotational speed signal of the shaft, and the electric motor motion parameter includes an angular displacement, a rotational speed and an acceleration of the electric motor at each time interval of the second interval time, wherein the calculating of the electric motor motion parameter includes calculating acceleration αm at the angular position change time, as the electric motor motion parameter, based on:

$$\alpha m=(Tm-Ks(\theta m-\theta 1))/Jm,$$

wherein Jm is a moment of inertia of the electric motor, Tm is a load torque of the electric motor at the angular position change time T, θm is an angular displacement of the electric motor, and θ1 is an angular displacement of the shaft, and Ks is an equivalent stiffness between the electric motor and the shaft.

8. A non-transitory storage medium, storing computer software which, when executed on a computer, causes the computer to implement the method of claim 7.

9. The control method of claim 7, wherein the calculating of the electric motor motion parameter at the angular position change time further comprises:
obtaining, according to the electric motor motion signal acquired at an angular position change time T, an angular displacement $\theta_m$ of the electric motor and a rotational speed $\omega_m$ of the electric motor at the angular position change time T, and
obtaining, according to the shaft motion signal acquired at the angular position change time T, an angular displacement $\theta_L$ of the shaft at the angular position change timeT, and controlling rotation of the electric motor according to the rotational speed $\omega_m$ of the electric motor and the electric motor control signal at the angular position change time T;
wherein the obtaining of the angular displacement of at least one of the electric motor and the shaft further comprises
calculating an angular acceleration of the electric motor at the angular position change time T according to the angular displacement $\theta_m$ of the electric motor and the angular displacement of the shaft at the angular position change time; and wherein the calculating, according to the electric motor motion parameter at the angular position change time T, the electric motor motion parameter at each time interval of the second interval time Δt, until the first encoder detects the next angular position change time T', further comprises:

obtaining an angular displacement $\theta_{L+1}$ of the shaft at a time T+Δt according to the shaft motion signal acquired at the time T+Δt, calculating a rotational speed $\omega_{m+1}$ of the electric motor, an angular displacement $\theta_{m+1}$ of the electric motor, and an angular acceleration $\omega_{ma+1}$ of the electric motor at the time T+Δt according to the rotational speed cam of the electric motor and the angular acceleration $\alpha_m$ of the electric motor at the angular position change time T, and the angular displacement $\theta_{L+1}$ of the shaft at the time T+Δt, and controlling the rotation of the electric motor according to the rotational speed $\omega_{m+1}$ of the electric motor and the electric motor control signal at the time T+Δt; and making T=T+Δt, and upon at this time T+Δt being less than the next angular position change time T' of the first encoder, then $\theta_m=\theta_{m+1}$, $\omega_m=\omega_{m+1}$, $\alpha_m=\alpha_{m+1}$, and returning to the obtaining of the angular displacement $\theta_{L+1}$; and upon at this time T+Δt being equal to the next angular position change time T' of the first encoder, then T=T', and returning to the calculating of the electric motor motion parameter at the angular position change time.

10. A non-transitory storage medium, storing computer software which, when executed on a computer, causes the computer to implement the method of claim 9.

11. A control method for controlling driving of a shaft by an electric motor, the electric motor being provided with a first encoder, a sampling interval time of the first encoder being a first interval time and the shaft being in transmission connection with the electric motor and including a second encoder provided on the shaft, a sampling interval time of the second encoder being a second interval time, the first time interval being relatively greater than the second interval time, the control method comprising:

acquiring a first encoder signal sent by the first encoder to obtain an electric motor motion signal of the electric motor at each time interval of the first interval time;

acquiring a second encoder signal sent by the second encoder to obtain a shaft motion signal of the shaft at each time interval of the second interval time;

calculating, according to the obtained electric motor motion signal and the obtained shaft motion signal, an electric motor motion parameter of the electric motor at a time point of each time interval of the second interval time; and controlling the electric motor based on the electric motor motion parameter calculated and an obtained electric motor control signal;

calculating, according to the electric motor motion signal obtained at an angular position change time detected by the first encoder and the shaft motion signal, the electric motor motion parameter at each time interval of the second interval time from the angular position change time, and calculating, according to the electric motor motion parameter at the angular position change time, the electric motor motion parameter at each time interval of the second interval time, until the first encoder detects a next angular position change time, wherein the obtained electric motor motion signal includes a position signal of the electric motor and a rotational speed signal of the electric motor, the shaft motion signal includes a position signal of the shaft and a rotational speed signal of the shaft, and the electric motor motion parameter includes an angular displacement, a rotational speed and an acceleration of the electric motor at each time interval of the second interval time, wherein the calculating of the electric motor motion parameter at the angular position change time further comprises:

obtaining, according to the electric motor motion signal acquired at an angular position change time T, an angular displacement $\theta_m$ of the electric motor and a rotational speed $\omega_m$ of the electric motor at the angular position change time T, and obtaining, according to the shaft motion signal acquired at the angular position change time T, an angular displacement $\theta_L$ of the shaft at the angular position change timeT, and controlling rotation of the electric motor according to the rotational speed $\omega_m$ of the electric motor and the electric motor control signal at the angular position change time T;

wherein the obtaining of the angular displacement of at least one of the electric motor and the shaft further comprises calculating an angular acceleration of the electric motor at the angular position change time T according to the angular displacement $\theta_m$ of the electric motor and the angular displacement of the shaft at the angular position change time; and wherein the calculating, according to the electric motor motion parameter at the angular position change time T, the electric motor motion parameter at each time interval of the second interval time Δt, until the first encoder detects the next angular position change time T', further comprises:

obtaining an angular displacement $\theta_{L+1}$ of the shaft at a time T+Δt according to the shaft motion signal acquired at the time T+Δt, calculating a rotational speed $\omega_{m+1}$ of the electric motor, an angular displacement $\theta_{m+1}$ of the electric motor, and an angular acceleration $\omega_{ma+1}$ of the electric motor at the time T+Δt according to the rotational speed $\omega_m$ of the electric motor and the angular acceleration $\alpha_m$ of the electric motor at the angular position change time T, and the angular displacement $\theta_{L+1}$ of the shaft at the time T+Δt, and controlling the rotation of the electric motor according to the rotational speed $\omega_{m+1}$ of the electric motor and the electric motor control signal at the time T+Δt; and making T=T+Δt, and upon at this time T+Δt being less than the next angular position change time T' of the first encoder, then $\theta_m=\theta_{m+1}$, $\omega_m=\omega_{m+1}$, $\alpha_m=\alpha_{m+1}$, and returning to the obtaining of the angular displacement $\theta_{L+1}$; and upon at this time T+Δt being equal to the next angular position change time T' of the first encoder, then T=T', and returning to the calculating of the electric motor motion parameter at the angular position change time.

12. A non-transitory storage medium, storing computer software which, when executed on a computer, causes the computer to implement the method of claim 11.

* * * * *